United States Patent [19]

Huerre et al.

[11] Patent Number: 4,971,273

[45] Date of Patent: Nov. 20, 1990

[54] DEVICE FOR MOUNTING A TELEVISION SET DEMAGNETIZATION LOOP

[75] Inventors: Dominique Huerre, Angers; Hubert Gate, Tierce, both of France

[73] Assignee: Societe Electronique de la Region Pays de Loire, Courbevoie, France

[21] Appl. No.: 438,112

[22] Filed: Nov. 20, 1989

[30] Foreign Application Priority Data

Nov. 24, 1988 [FR] France ................................ 88 15330

[51] Int. Cl.[5] ................................................ F16L 3/00

[52] U.S. Cl. ...................................... 248/74.2; 248/71

[58] Field of Search ............... 248/65, 74.2, 71, 221.3, 248/316.7

[56] References Cited

U.S. PATENT DOCUMENTS

| | | | |
|---|---|---|---|
| 959,076 | 5/1910 | Scanlon | 248/65 X |
| 1,218,181 | 3/1917 | Homer | 248/71 |
| 1,585,846 | 5/1926 | Fahnestock | 248/74.2 X |
| 3,252,677 | 5/1966 | Raymond | 248/74.2 X |
| 3,262,662 | 7/1966 | Gastaldi | 248/74.2 |
| 3,643,020 | 2/1972 | St. George et al. . | |

FOREIGN PATENT DOCUMENTS

| | | | |
|---|---|---|---|
| 281759 | 9/1988 | European Pat. Off. . | |
| 342688 | 10/1921 | Fed. Rep. of Germany | 248/71 |
| 8716945 | 4/1988 | Fed. Rep. of Germany . | |
| 930151 | 1/1948 | France | 248/74.2 |
| 2180067 | 11/1973 | France . | |

*Primary Examiner*—Alvin C. Chin-Shue

*Attorney, Agent, or Firm*—Oblon, Spivak, McClelland, Maier & Neustadt

[57] ABSTRACT

To mount a television set demagnetization loop, parts with hooks are used, mounted so as to be free in rotation on the heads of the cathode-ray tube fastening screws.

7 Claims, 1 Drawing Sheet

DEVICE FOR MOUNTING A TELEVISION SET DEMAGNETIZATION LOOP

BACKGROUND OF THE INVENTION

The present invention pertains to a device for mounting a television set demagnetization loop.

To mount a demagnetization loop, it is common to use devices with elastic binding strips. The positioning of these known devices has to be done by hand, and this does not always permit the accurate positioning of the loop with respect to the tube.

SUMMARY OF THE INVENTION

An object of the present invention is a device to mount a demagnetization loop for a cathode-ray tube of a television set, a device that is simple and inexpensive to make and enables the optimal mounting of the loop to be automated, without requiring any manual intervention during or after the mounting, this device being independent of the dimensions of the cathode-ray tube.

According to the invention, the demagnetization loop mounting device comprises a supporting part for each loop mounting point, this supporting part comprising at least one hook and being mounted so as to be free in rotation. The mounting points are preferably located near the four corners of the cathode-ray tube casing. Preferably, these four mounting points are the screws for fastening the cathode-ray tube to the cabinet of the television set. Advantageously, the mounting devices are mounted so as to be free in rotation on the heads of the fastening screws of the tube. According to one embodiment of the invention the supporting part, which is preferably molded out of plastic material, has two hooks formed on a cross-member symmetrically with respect to the junction of this cross-member with a supporting bracket, the base of which has means enabling it to be fastened, so as to be free in rotation, to the loop mounting point.

BRIEF DESCRIPTION OF THE DRAWING

The present invention will be better understood from the detailed description of an embodiment, taken as a non-restrictive example and illustrated by the appended drawing, wherein.

DESCRIPTION OF A PREFERRED EMBODIMENT

Figure 1:
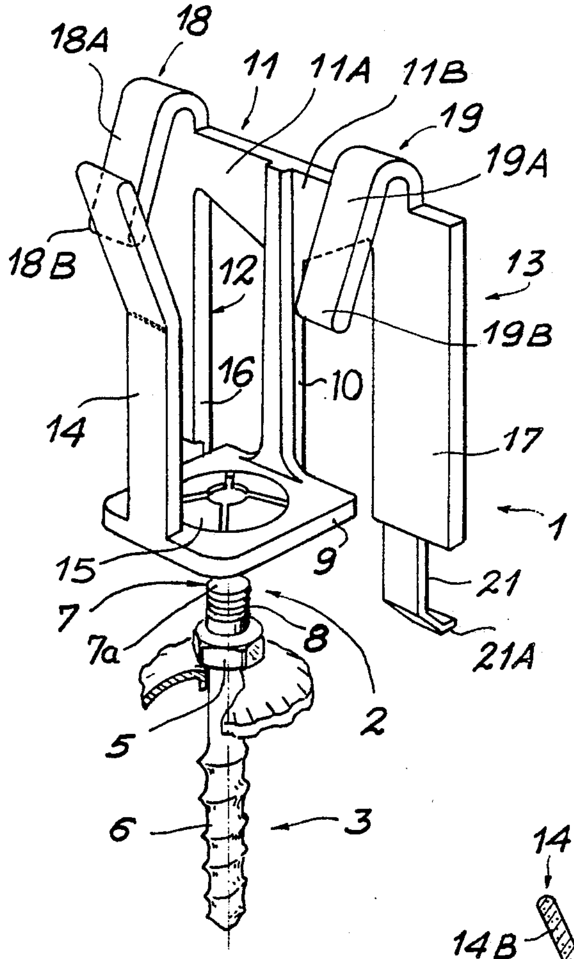
FIG. 1 is an exploded view, in perspective, of a mounting device according to the invention.

The device 1 for mounting a demagnetized loop, shown in the drawing, is mounted on the head 2 of a screw 3 for fastening a cathode-ray tube (not shown). This screw 3, which is of the self-tapping type for example, goes through the hole of a fastening lug 4 (partially shown in FIG. 2) shaped or soldered to the implosion-resistant band of the cathode-ray tube, and is screwed into an appropriate location of the exterior of the television set. Usually, the implosion-resistant band has four fastening lugs of this type which are approximately on the diagonals of the casing of the cathode-ray tube on which it is positioned. As the mounting of the cathode-ray tube in the casing of the television set is well known per se, it shall not be described in greater detail.

The head of a cathode-ray tube fastening screw generally has the shape of a hexagonal block. To make it possible for the device 1 to be mounted on a cathode-ray tube fastening screw, this screw is modified as follows. On the hexagonal head 5, opposite the screw body 6, an axial extension 7 with a small length, for example of about 5 mm to 10 mm is formed. This extension 7 has the shape of a grooved rod.

The demagnetizing loop mounting device proper consists essentially of a base 9, a bracket 10 formed on the base 9, a cross-member 11 formed at the end of the bracket 10, two hook devices 12, 13 formed at the ends of the cross-member 11, and a guiding strip 14 formed on the base 9. The set of these elements of the device 1 is preferably made by being molded out of plastic material.

The base 9 takes the form of a substantially square-shaped plate, the central zone 15 of which is slightly convex (as seen from the bracket 10), circular and with reduced thickness, and has an axial hole with a diameter substantially equal to the diameter of the part 7A of the extension 7. The zone 15 of the base 9 is slotted in the form of a cross by two diametral slots that are mutually perpendicular and thus demarcate four circular sectors. The zone 15 thus forms a circlip element for fastening the device 1 to the extension 7 of the screw 3. It suffices to push the device 1 forcefully on to the extension 7, with the grooves 8 causing the four circular sectors of the zone 15 to bend.

The bracket 10 is formed in the middle of one of the sides of the base 9, perpendicularly to this base. The cross-member 11, formed at the end of the bracket 10, consists of two identical arms 11A, 11B placed symmetrically with respect to the bracket 10, perpendicularly to it.

Each of the hook devices 12, 13 essentially has a body, 16, 17 respectively, shaped like a rectangular bar, a hook 18, 19 respectively, formed at the end of the bar close to its link with the arm 11A, 11B, and a supporting tongue 20, 21 respectively, formed at the other end of the bar.

The bars 16, 17 are parallel to the bracket 10, pointed towards the base 9, and their length is substantially equal to that of the bracket 10. The bars 16, 17 and the arms 11A, 11B are coplanar.

The hooks 18, 19 are in the form of folded tongues. These tongues have a plane part 18A, 19A connected by a bent part to the end of the corresponding bar 16, 17, on the side where this bar has its junction with the arm 11A, 11B respectively. The plane parts 18A, 19A make an angle of about 30 degrees to 50 degrees with the plane of the bars 16, 17 and are pointed approximately towards the junction between the base 9 and the bar 14. The length of the plane parts 18A, 19A is equal to or slightly smaller than half of the length of the bars 16, 17. The respective dimensions of the plane parts 18A, 19A of the bars 16, 17 and the value of the angle formed between the plane parts and the bars depend on the diameter of the cable 1A, forming the demagnetization loop, and on the space available in the cabinet of the television set. For one exemplary embodiment, the length of the bars 16, 17 is about 25 mm., the length of the plane parts 18A, 19A is about 10 mm. and that of their angle with the plane of the bars 16, 17 is about 40 degrees for a cable 1A with a diameter of about 6 to 10 mm.

The supporting tongues 20, 21 are formed in the extension of the bars 16, 17, their ends being bent at 90 degrees opposite the screw 3. The length of these tongues 20, 21 is such that when the device 1 is in position on the head 2 of the screw 3 and when this screw is screwed into position to fasten the cathode-ray tube, the ends 20A, 21A of these tongues are just in contact with the lug 4.

Figure 2:
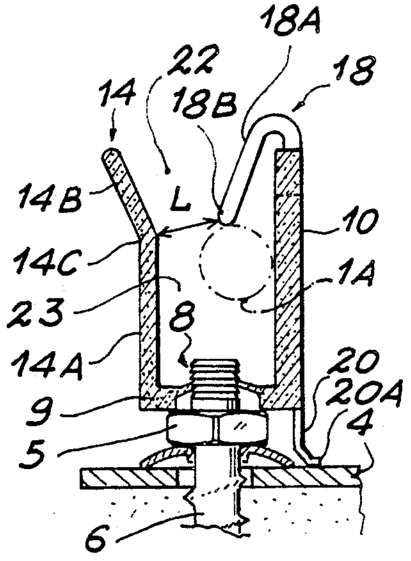
FIG. 2 is an axial sectional view of the device of FIG. 1, in mounted position.

The length of the bar 14 is substantially equal to that of the bars 16, 17. This bar 14 has a first rectilinear part 14A, parallel to the bracket 10, which extends approximately up to the height of the end 18B, 19B of the hooks 18, 19, and a second part 14B, also rectilinear and parallel to the bracket 10, forming an angle of about 10 to 20 degrees with the first part, this second part being away from the bracket 10. The junction between the parts 14A and 14B is referenced 14C. Thus, between the part 14B and the plane parts 18A, 19A, a flared aperture 22 is formed for the introduction of a cable, with an angle of about 40 degrees to 50 degrees. The narrowest part of this aperture 22 is between the junction 14C and the ends 18B, 19B of the parts 18A, 19A. The width L of this narrowest part is slightly smaller (by about 1 to 3 mm.) than the diameter of the cable 1A. Thus, through the elasticity of the bar 14 and of the hooks 18, 19, once the cable 1A is made to penetrate the space 23 between the part 14A and the bars 16, 17, this cable remains imprisoned therein. Owing to the fact that the tensile force exerted on the cable 1A, during the positioning of the demagnetization loop, is exerted in a direction approximately parallel to those part of the tongues 18A, 19A opposite to the screw 3, the cable 1A then gets jammed between the tongues 18, 19 and the rods 16, 17 respectively, as shown in FIG. 2. Through the symmetrical arrangement of the hooks 18, 19 with respect to the bracket 10 and the base 9, through the slight flexibility of the bracket 10 (the section of which is chosen accordingly), through the possibility of rotation of the devices 1 around the axis of the screws 3, and through the arrangement of the four mounting devices 1 in the direction of the diagonals of the envelope, the demagnetization loop may be introduced simply by an automaton in these four mounting devices without having to be positioned with exactness, and can get positioned by itself in the accurate position, i.e. symmetrically with respect to the axes 0x, 0y of the screen, as close as possible to the implosion-resistant band, and with sufficient tension of the loop.

It will be noted that the tongues 20, 21, which are slightly elastic, prevent any excessive bending of the bracket 10 owing to the stresses exerted by the demagnetization loop, especially during its positioning.

The parts 1 of the invention are standard parts irrespectively of the type and size of the cathode-ray tube, the mounting screws 3 being standard screws.

What is claimed is:

1. A device for mounting a demagnetization loop of a cathode-ray tube television set comprising:
- a base member;
- a bracket member extending upwardly from said base member;
- a cross-member formed at the end of said bracket member, said cross-member comprising at least one bar member extending downwardly from said cross-member and in a direction parallel to said bracket member, wherein said bar member comprises at least one hook formed on top of said bar member; and
- a guiding member formed on the base member and opposing said bracket member;
- wherein said device is rotatably mounted on one of a plurality of loop mounting points and an opening for the insertion of a cable for forming the loop is formed between the guiding member and the at least one hook, said hook being inclined at an angle to said bar member and extending downwardly into said opening, said opening leading into a space bounded by said bracket member, said base member and said guiding member, such that when said cable is inserted through said opening into said space, said cable is freely movable within said space to allow for an accurate positioning of said loop with respect to said cathode-ray tube.

2. A mounting device according to claim 1, wherein said loop mounting points are located on diagonals of a casing on which said cathode ray tube is mounted.

3. A mounting device according to claim 1, wherein said loop mounting points comprise screws for fastening said cathode-ray tube in a cabinet of said television set.

4. A mounting device according to claim 3, wherein said fastening screw comprises a head, said device being rotatably mounted on the head of said fastening screw.

5. A mounting device according to claim 3, wherein said device is rotatably mounted on said loop mounting point through base fastening means on said base member; and wherein said cross-member comprises two bar members which extend on both sides of said bracket member in a direction parallel to said bracket member, each of said bar members comprising said hooks.

6. A mounting device according to claim 5, wherein said base fastening means comprises a split elastic washer formed on said base which fits on said fastening screws.

7. A mounting device according to claim 5, wherein said opening formed by said guiding member and said at least one hook is a flared opening, a smaller width of said opening being smaller than the diameter of said cable.

* * * * *